US010652732B2

(12) United States Patent
Brickell et al.

(10) Patent No.: US 10,652,732 B2
(45) Date of Patent: May 12, 2020

(54) PROVISIONING AUTHENTICATION KEYS IN COMPUTER PROCESSOR

(71) Applicant: Intel Corporation, Santa Clara, CA (US)

(72) Inventors: Ernie F. Brickell, Portland, OR (US); Rachid El Bansarkhani, Raunheim (DE)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 15/052,516

(22) Filed: Feb. 24, 2016

(65) Prior Publication Data

US 2017/0244568 A1    Aug. 24, 2017

(51) Int. Cl.
| | |
|---|---|
| *H04W 12/04* | (2009.01) |
| *H04L 29/06* | (2006.01) |
| *H04W 12/06* | (2009.01) |
| *H04L 9/08* | (2006.01) |
| *H04L 9/32* | (2006.01) |

(52) U.S. Cl.
CPC .......... *H04W 12/04* (2013.01); *H04L 9/0861* (2013.01); *H04L 9/3247* (2013.01); *H04L 63/061* (2013.01); *H04L 63/0823* (2013.01); *H04W 12/06* (2013.01); *H04L 2209/80* (2013.01)

(58) Field of Classification Search
CPC .... H04W 12/04; H04W 12/06; H04L 63/061; H04L 63/0823; H04L 9/00; G06F 1/26; G06Q 40/00; G08B 13/14
See application file for complete search history.

(56) References Cited

U.S. PATENT DOCUMENTS

| | | | |
|---|---|---|---|
| 2008/0010458 A1* | 1/2008 | Holtzman | H04L 63/0823 713/175 |
| 2012/0278241 A1* | 11/2012 | Brown | G06F 21/32 705/67 |

* cited by examiner

*Primary Examiner* — Thanhnga B Truong
(74) *Attorney, Agent, or Firm* — Schwegman Lundberg & Woessner, P.A.

(57) ABSTRACT

Embodiments are directed to provisioning a general-use basis for authentication of a processor device. During manufacture, a hardware processor stores a secret value and shares a derived value produced based on the secret value with a secure service. These values may be used in a limited-use initial authentication process to authenticate the hardware processor. A general-use basis for authentication not so limited as the initial authentication process is established subsequent to the manufacture of the hardware processor. The general-use basis for authentication may include a public-private key pair, and is established upon successful completion of the initial authentication process. Authentication using the general-use process produces an authentication traceable to the manufacture of the hardware processor.

11 Claims, 9 Drawing Sheets

PROVISIONING AUTHENTICATION KEYS IN COMPUTER PROCESSOR

TECHNICAL FIELD

Embodiments described herein generally relate to information processing and security, more particularly, to provisioning authentication keys in a computer processor that are traceable to the manufacture of the processor.

BACKGROUND

Processor-based computing platforms are employed in a wide variety of applications, from personal computers (PCs), smartphones, and other information-oriented devices, to industrial controls, vehicles, appliances, consumer electronic articles, and wearable devices, just to name a few. In virtually every application, reliable operation and information security are paramount.

Processor manufacturers have a business need to provision cryptographic keys in their processors during manufacturing, so that they are able to securely authenticate their processors after the processors have left manufacturing. Authentication of processors is used, for example, to provide attestation for Trusted Execution Environments (TEEs) or to provision the attestation keys. Present-day manufacturing methods generally involve generating unique key pairs in a back-end secure server, and transmitting keys over a secure encrypted communications channel to a secure service that performs the authentication when called upon.

One concern with this approach is the possibility that quantum computers may become a reality. Although quantum computers do not exist today, and it is generally thought that they will not be built for at least 15 years, the problem still poses a risk to products built in the next few years, since an attacker could capture the key exchange messages and the encrypted communications channel when they are sent, and then years later, with new computational capabilities offered by quantum computers, break the key exchange and thus obtain all of the keying material for processors made years earlier. If some of those processors were still being used and authenticated, the attacker could successfully masquerade as one of these processors.

Although the key exchange attack vector might be avoided by configuring unique keys into the processors and generating public and private key pairs during their manufacture, such an operation involves individually powering each processor and executing a key-generation algorithm. This operation tends to impact manufacturing throughput, particularly in high-volume production lines, where even milliseconds are accounted for. A practical solution is therefore needed to address these, and related, challenges.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to securely provisioning cryptographic keys in a processor. In some embodiments, the processor itself is tasked with creation of the keys, and sharing of a public key with a secure service in a secure manner. To assure that the key-sharing processor is authentic, an initial basis for authentication is configured between the processor and the secure service at the time of manufacture. The initial basis for authentication is later relied upon, at a point in time after the processor is manufactured, to verify that the processor is the same individual processor that it purports to be when it seeks to establish the key exchange with the secure service.

Figure 1A:
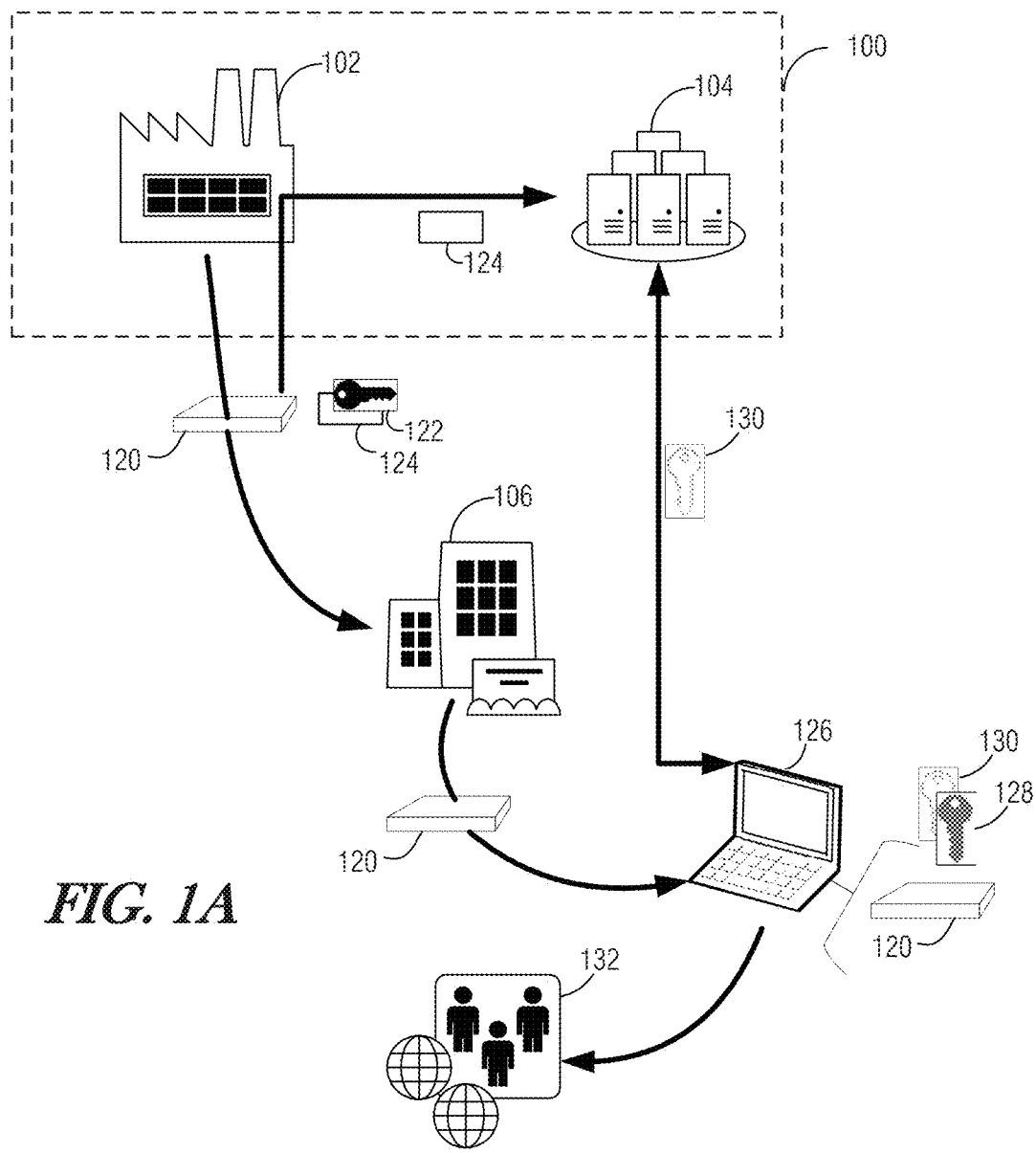
FIG. 1A is a simplified production flow diagram illustrating portions of the manufacturing and distribution processes and the applicability of certain aspects of the embodiments to those processes.

FIG. 1A is a simplified production flow diagram illustrating portions of the manufacturing and distribution processes and the applicability of certain aspects of the embodiments to those processes. Manufacturer 100 includes factory 102 and secure service 104. Factory 102 is a semiconductor fabrication and testing facility that physically produces processor 120. Secure service 104 is a server that maintains a secure database of manufactured processors and their respective bases for authentication, such as cryptographic keys, and the like.

Manufactured processor 120 may be transferred to a distributor or original equipment manufacturer 106 (which may be the same entity as the manufacturer of the processor, or a third-party entity), that incorporates the processor 120 into an end-product 126, such as a computer system, or any apparatus that uses the processor, such as an information device, an industrial device, a consumer-electronics device, a medical device, a vehicle, an appliance, etc. The end-product 126 may be further transferred to a retailer 132, and ultimately to the end-customer.

According to some embodiments, an initial basis for authentication of the processor is configured into processor 120 by manufacturer 100. As depicted, the initial basis for authentication includes a secret value 122, which is generated by the processor itself and maintained exclusively and securely on the processor. In various embodiments, the secret value 122 may be a private key, or some other secret value that is based on a randomly-generated seed value. The seed value may be generated on-board the processor 120 (e.g., by a random-number generator circuit, a physical unclonable function cell, or the like), or it may be provided to the processor 120 from a secure external source at the fabrication facility that uses a suitable mechanism for generating the value.

The processor 120 also generates a derived value 124 that is based on the secret value 122. Derived value 124 may be a public key associated with a secret private key, or it may be a cryptographic hash based at least in part on the secret value, or it may be a result of a pseudo random function based at least in part of the secret value 122. Derived value 124 is shared with secure service 104, and secure service 104 maintains a copy of derived value 124 for future use.

In a related embodiment, the secret value 122 and derived value 124, by their nature, are hash-based or symmetric key based cryptographic computations, and are computationally efficient to produce, compared to multi-use cryptographic schemes such as RSA, for instance. In a related embodiment, secret value 122 and derived value 124 constitute a hash-based cryptographic key pair of a one-time-use type (e.g., a Lamport one-time signature scheme), or some limited-use variant thereof (e.g., Merkle signature scheme).

At a post-manufacture stage, e.g., some later stage in the production or distribution of processor 120 or its end-product 126, or in the field, there may be a call to generate an authentication scheme that is of a multi-use variety, such as RSA, DSA, ECDSA, a hash-based scheme such as XMSS (eXtended Merkle Signature Scheme) or an anonymized scheme such as DAA or EPID configured for a greater number of uses than the initial basis for authentication. Hereinafter, this type of authentication basis is referred to as a general-use authentication scheme. The general-use authentication scheme, as its name implies, is less limited than the initial basis for authentication, but is more computationally intensive to create. In one example embodiment, the initial basis for authentication is at least three orders of magnitude faster to generate, in computational terms, than the general-use authentication scheme.

Notably, in some embodiments, the validity of the general-use authentication scheme is based on the initial basis of authentication. Accordingly, when called upon to create the general-use authentication scheme, processor 120 utilizes the previously-configured initial basis for authentication to verifiably deliver the general-use authentication key to secure service 104. As depicted, the general-use authentication scheme produces a public/private key pair represented as private key 128 and public key 130. Public key 130 is provided to secure service 104 in a such a manner that the authenticity of processor 120 is assured based on verification of the processor's knowledge of secret value 122. In one embodiment, secret value 122 is a private key, and it is used to sign public key 130.

Figure 1B:
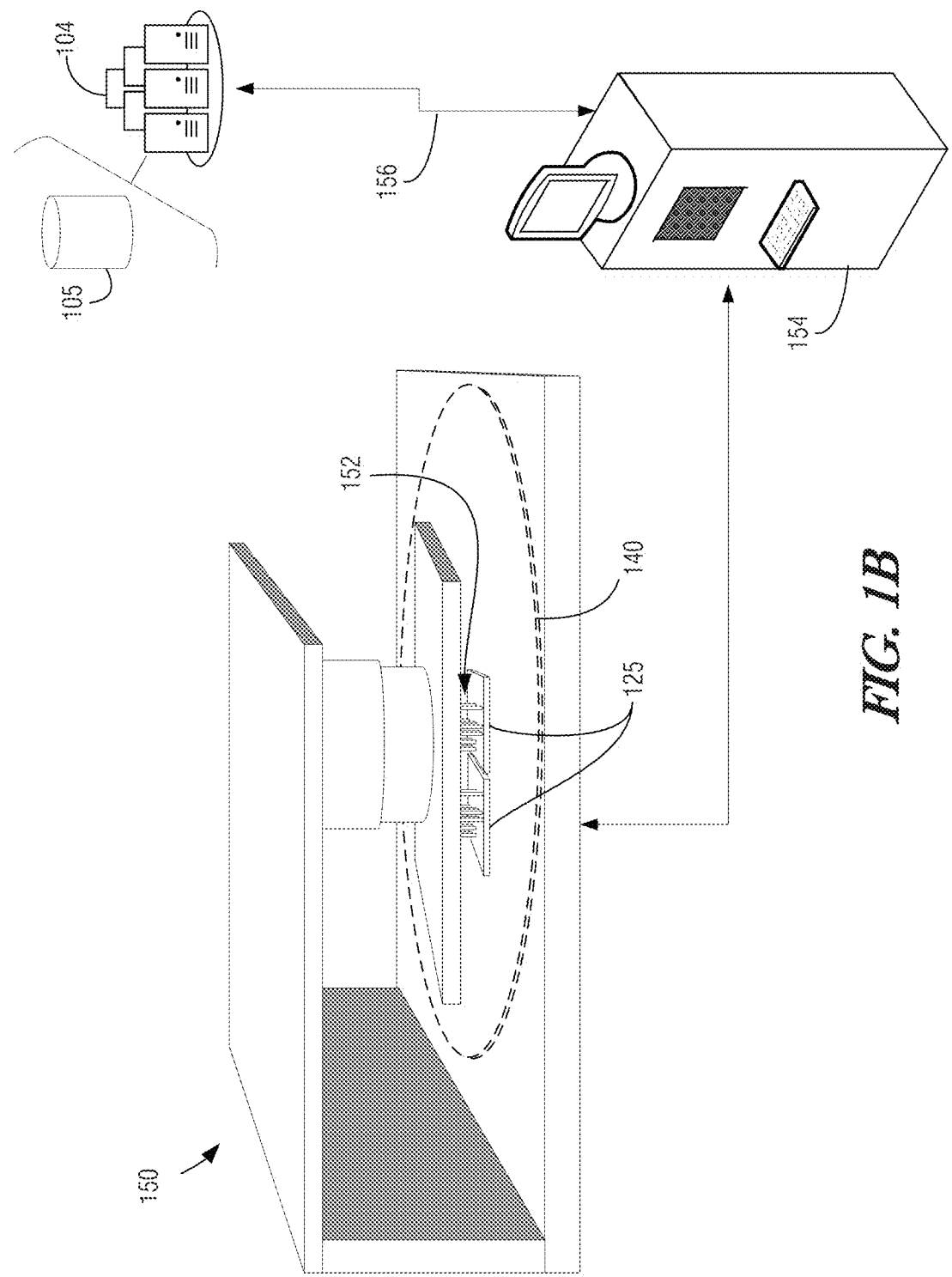
FIG. 1B is a schematic diagram illustrating portions of the manufacturing process where an initial basis for authentication is configured into a processor according to some embodiments.

FIG. 1B is a schematic diagram illustrating portions of the manufacturing process where the initial basis for authentication is configured into a processor according to some embodiments. The manufacturing process carried out by factory 102 includes a manufacturing fixture 150 that supplies power and input signals to processor 120. As depicted, manufacturing fixture 150 may be an in-circuit test fixture that uses a set of contact probes 152 to connect with power and input/output pads formed on the processor's integrated circuit (IC) die 125. In various embodiments, an in-circuit testing arrangement may be performed when the IC die of processor 120 is still on wafer 140, or it may be performed later in the manufacturing process, before or after packaging of the processor 120.

Manufacturing fixture 150 includes controller 154, which includes a computing device having processing and communications facilities that are communicatively coupled to secure service 104. Secure service 104 maintains secure database 105 in which the initial and general-use bases for authentication are stored for each manufactured processor. During manufacture, upon creation of the derived value 124 by processor 120, controller 154 passes the derived value 124 to secure service 104 via interface 156. In a related embodiment, prior to sending the derived value 124 to secure service 104, manufacturing fixture 150 digitally signs the derived value 124.

Figure 2:
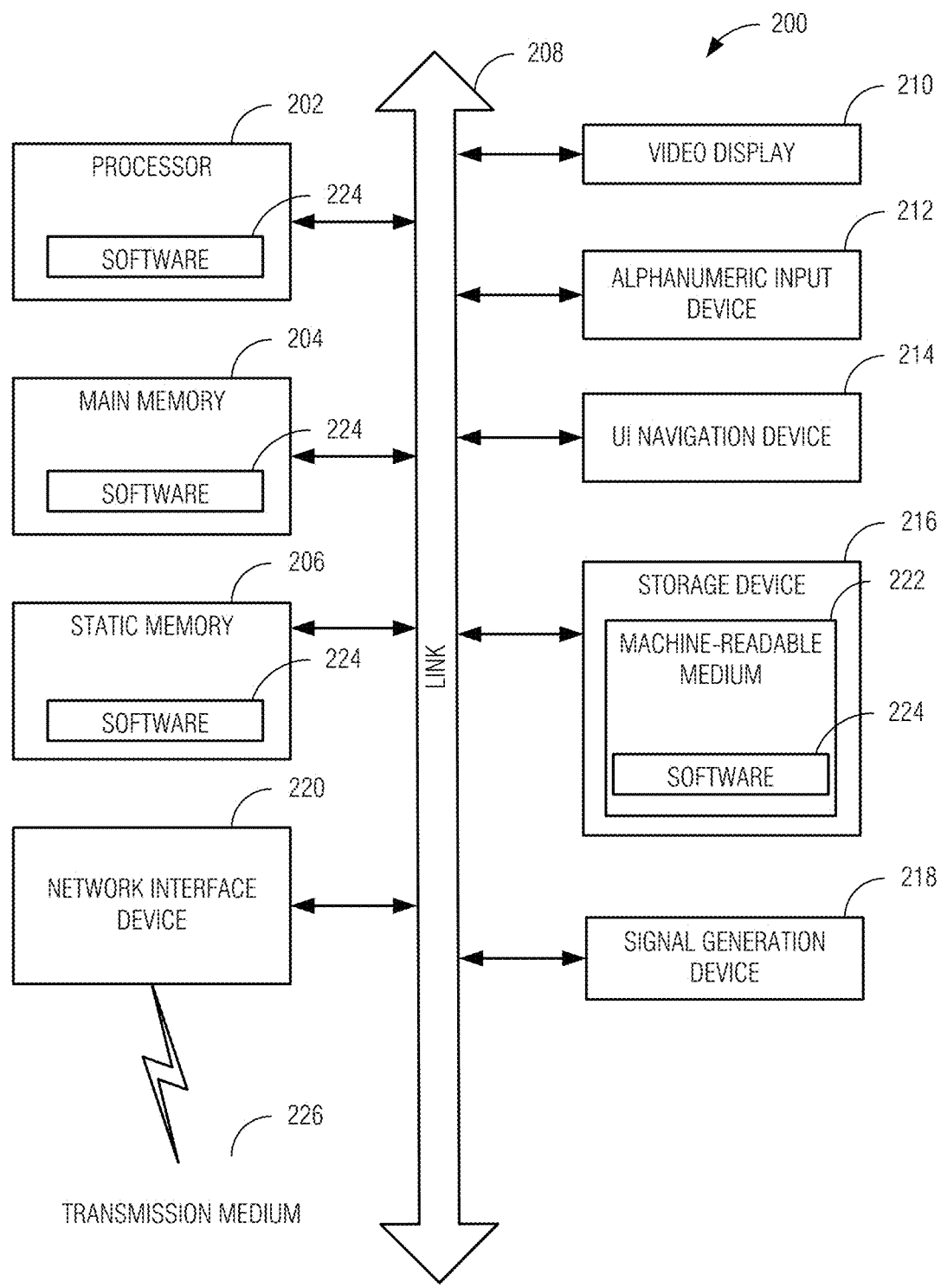
FIG. 2 is a block diagram illustrating an exemplary system architecture of a processor-based computing device according to an embodiment.

FIG. 2 is a block diagram illustrating a computer system in the example form of a general-purpose machine. In certain embodiments, programming of the computer system 200 according to one or more particular algorithms produces a special-purpose machine upon execution of that programming In a networked deployment, the computer system 200 may operate in the capacity of either a server or a client machine in server-client network environments, or it may act as a peer machine in peer-to-peer (or distributed) network environments. Computer system 200 represents an example architecture of controller 154, one or more servers of secure service 104, and in some embodiments, end-product 126 when the end-product is a computer system.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
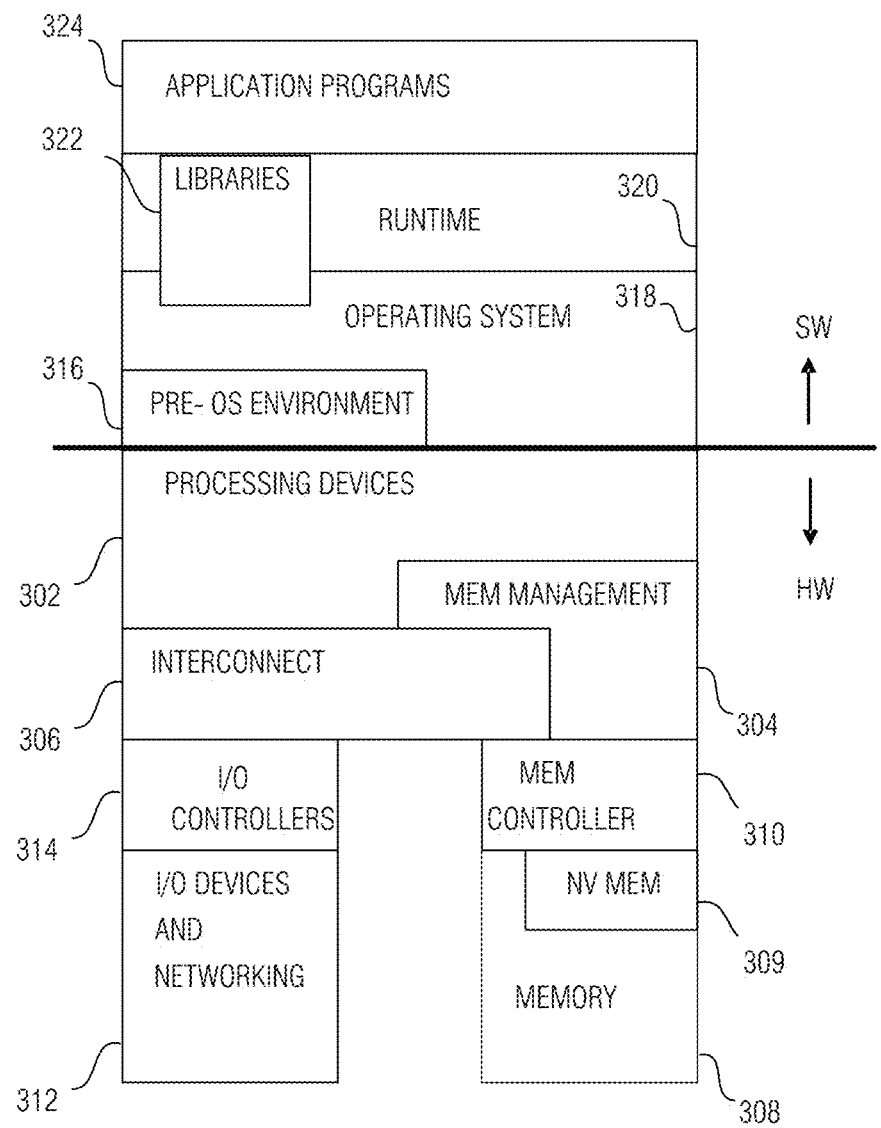
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
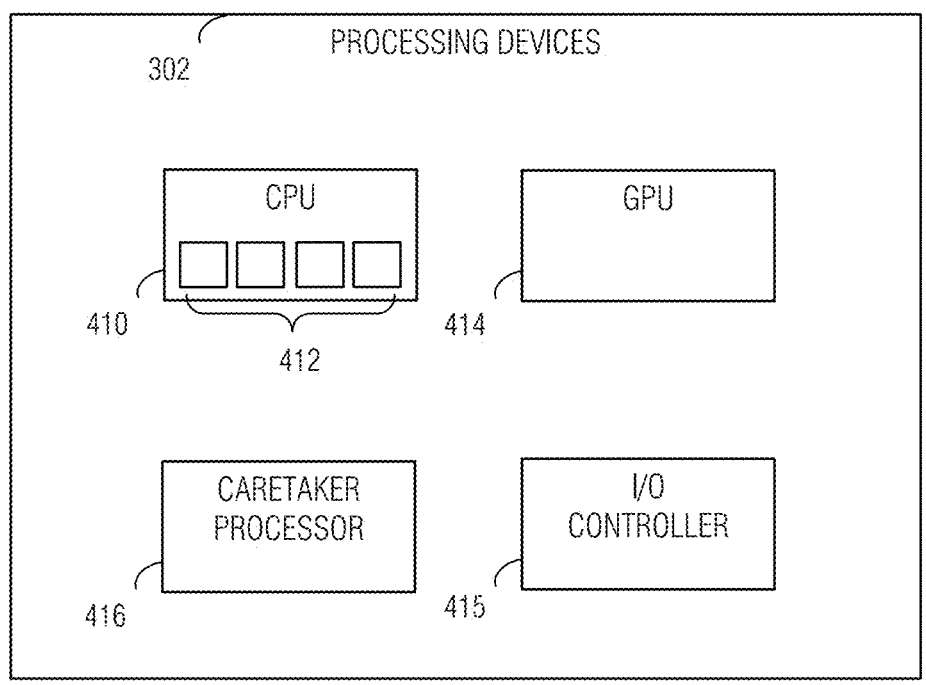
FIG. 4 is a block diagram illustrating examples of processing devices that may be implemented on a computer system, such as the computer system described with reference to FIGS. 2-3, according to some embodiments.

FIG. 4 is a block diagram illustrating processing devices 302 according to some embodiments. One, or a combination, of these devices may constitute processor 120 in some embodiments. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

Figure 5:
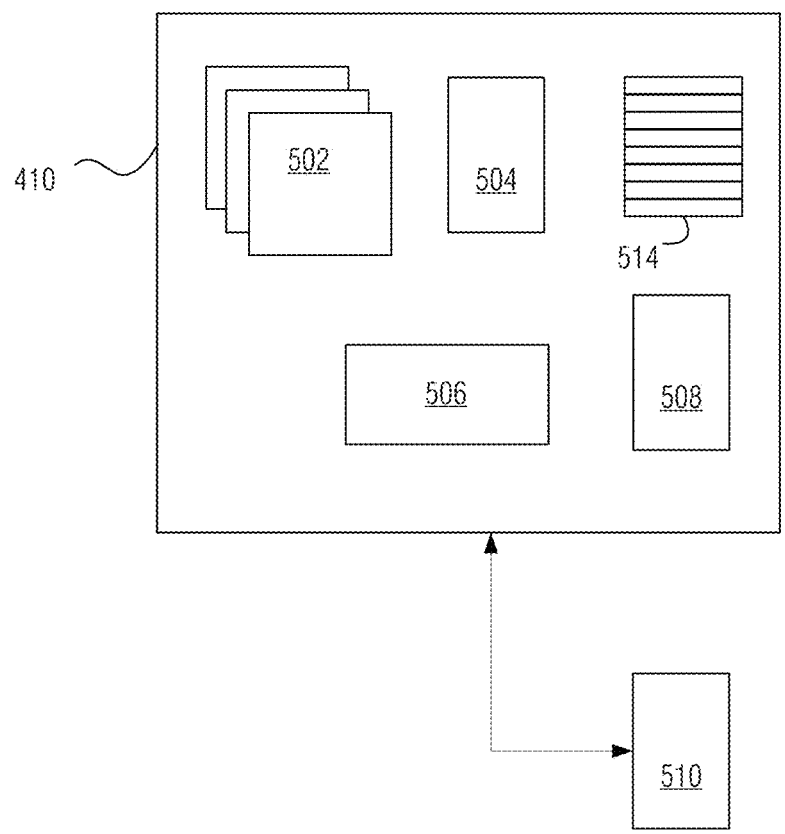
FIG. 5 is a block diagram illustrating example components of a CPU as one of the processing devices depicted in FIG. 4, according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect.

CPU 410 includes non-volatile memory 508 (e.g., flash, EEPROM, etc.) for storing certain portions of foundational code, such as initialization code, authentication conversion (AC) code, and microcode. Also, CPU 410 may be interfaced with an external (e.g., formed on a separate IC) non-volatile memory device 510 that stores foundational code that is launched by the initialization code, such as system BIOS or UEFI code.

In the embodiment depicted, CPU 410 also includes a set of secure registers 514. The secure registers 514 may be organized as a set of n-bit registers (with n being 32, 64, 128, etc.). In one type of embodiment, secure registers 514 are implemented using non-volatile memory, such as flash or EEPROM memory. In another embodiment, secure registers 514 are implemented using a programmable read-only memory (PROM) that may be written only once. In a related embodiment, secure register 514 is implemented using field-programmable fuses, which are also a form of permanent (i.e., one-time-writable) memory. In a related embodiment, secure registers 514 are used to store critical data, such as secret value 122, private key 128, a unique processor ID (UID) and the like.

In some embodiments, CPU 410 is configured to provide an Isolated Execution Environment. In one example Isolated Execution Environment, CPU at boot time loads a code module into its internal memory. Before the code is executed, the CPU computes a hash of the code in the module, and either compares that hash to a value stored in hardware or performs a digital signature validation on the hash using a public key in which either the public key or a hash of the public key is stored in the CPU. If the check passes, then the CPU proceeds to the privileges of the module. The privileges may be stored in the CPU along with the hash of the module, or they may be included in the code module itself.

The privileges may include access to restricted resources such as secret keys in the CPU. The CPU then allows this code module to execute with the allowed privileges. It does not allow any other code to execute until the code module has finished, and access to the restricted resources have been restricted. The CPU may force a reboot instead of allowing any execution after the code module has finished.

In a related embodiment, an Isolated Execution Environment may be instantiated at a time other than at boot time. Examples include Authenticated Code Modules or Software Guard eXtensions.

FIGS. 6A, 6B, 7, and 8 illustrate various example processes according to various embodiments. It is important to note that each example process is a richly-featured embodiment that may be realized as described; in addition, portions of each process may be implemented while others are excluded in various embodiments. The following Additional Notes and Examples section details various combinations, without limitation, that are contemplated. It should also be noted that in various embodiments, certain process operations may be performed in a different ordering than depicted, provided that the logical flow and integrity of the process is not disrupted in substance.

Figure 6A:
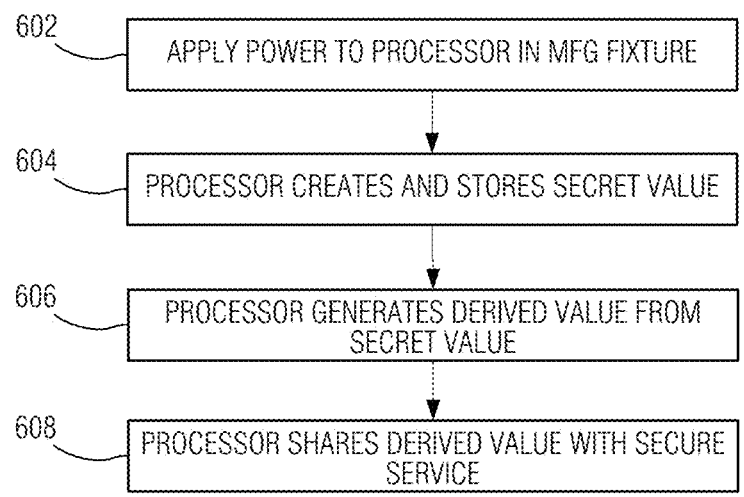
FIG. 6A is a flow diagram illustrating an automated manufacturing process that configures a processor with an initial basis for authentication of the processor according to some embodiments.

FIG. 6A is a flow diagram illustrating an automated manufacturing process that configures a processor with an initial basis for authentication of the processor according to some embodiments. At 602, manufacturing fixture 150 applies power to processor 120. At 604, processor 120 creates and stores a secret value 122. As discussed above, the secret value 122 may be generated entirely within processor 120. In another embodiment, the secret value 122 may be generated by manufacturing fixture 150, transferred to processor 120, and all other copies may be destroyed. In a related embodiment, manufacturing fixture 150 may provide a random-number seed to processor 120, from which processor 120 generates the secret value 122.

At 606, processor 120 generates a derived value 124 from the secret value 122. As will be described in illustrative examples below, the secret value 122 and derived value 124 may be keys generated by a hash-based signature scheme, such as a one-time signature scheme, or a n-time-use signature scheme, where n is some practical limited quantity that is limited according to processing time constraints for the manufacturing process. For instance, N may be less than 2015, less than 129, less than 33, less than 9, etc., according to various embodiments. In another embodiment, also described in greater detail below, the derived value may be a commit value that is derived from the secret value by applying a cryptographic hash function or pseudo random function to the secret value (possibly with additional input).

At 608, processor 120 shares the derived value 124 with secure service 104. This operation generally involves outputting the derived value 124 to be read by manufacturing fixture 150. Depending on the networking arrangement, the manufacturing fixture 150 may use an authentication scheme for sending the derived value 124 to secure service 104. In one embodiment, the manufacturing fixture 150 has a private signature key that it uses to sign the derived value 124.

Figure 6B:
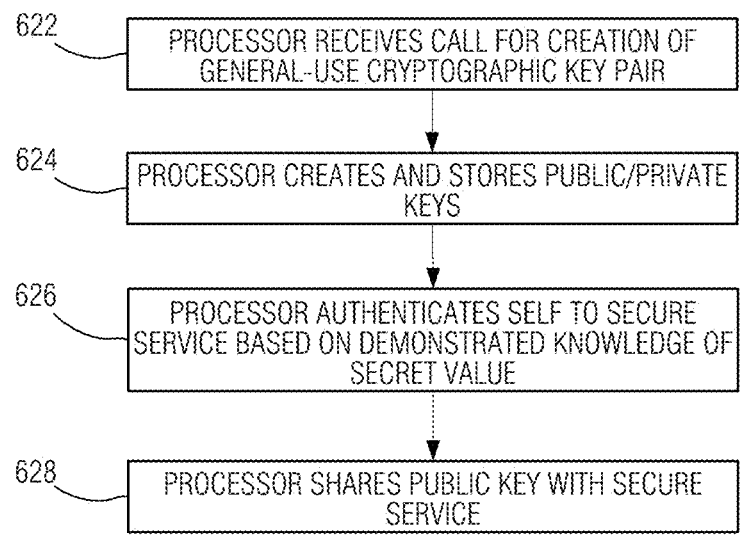
FIG. 6B is a flow diagram illustrating a process of operating a processor subsequent to its manufacture to establish a multi-use cryptographic key pair according to some embodiments.

FIG. 6B is a flow diagram illustrating a process of operating a processor subsequent to its manufacture to establish a multi-use cryptographic key pair according to some embodiments. These operations may be carried out by processor 120 operating under the control of a system or application program, although processor 120 may rely on processor-stored firmware code and an isolated execution environment that is isolated from other code when accessing the secret value.

At 622, the processor 120 (running under software control) receives a call for creation of the general-use authentication keys. At 624, processor 120 creates and stores public/private keys. This operation involves generation of a new secret value in an isolated execution environment of processor 120.

At 626, processor 120 authenticates itself and binds its initial authentication to the general-use public key to be shared. In one embodiment, this may be achieved by digitally signing the general-use public key with the secret value if the secret value is a private key of a cryptographic key pair. In an embodiment where a commitment system is used, the initial authentication may be bound to the new general-use public key by computing a cryptographic hash based on a combination of the new public key and the commit value, as an example, and subsequently revealing the secret value to the secure service 104. With valid authentication, at 628, processor 120 shares the new general-use public key with secure service 104. In a related embodiment, a digital certificate may subsequently be generated and disseminated by secure service based on the public key.

Figure 7:
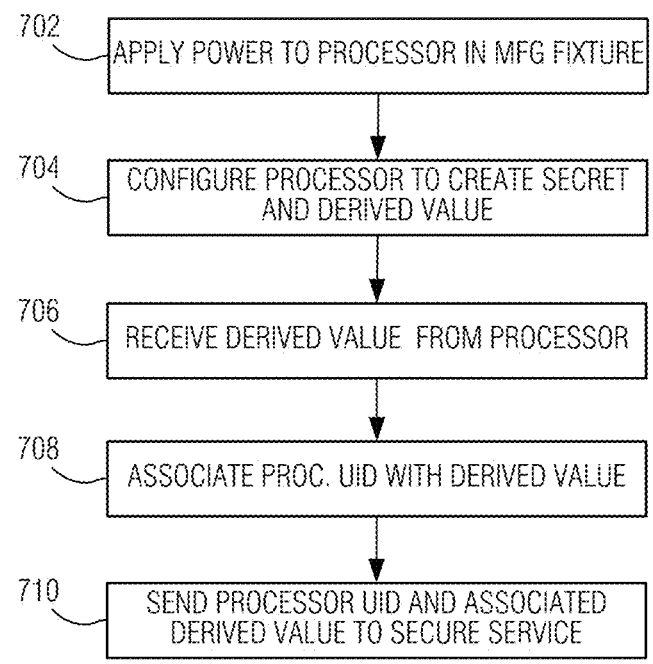
FIG. 7 is a process flow diagram illustrating an example manufacturing process carried out by a manufacturing fixture to establish an initial basis for authentication of the processor according to some embodiments.

FIG. 7 is a process flow diagram illustrating an example manufacturing process carried out by manufacturing fixture 150 to establish an initial basis for authentication of the processor according to some embodiments. At 702, manufacturing fixture 150 applies power to processor 120. At 704, manufacturing fixture 150 configures processor 120 to create the secret and derived values 122, 124. This may be achieved by writing the applicable code to a non-volatile data store on board the processor 120, and causing the processor 120 to execute that code. At 706, manufacturing fixture 150 receives the derived value 124 from the processor 120. At 708, the processor's unique ID (UID) may be associated with the derived value 124 for indexing purposes, although in various other embodiments the derived value 124, itself, may be used to identify the processor 102 and index database record(s). At 710, manufacturing fixture 150 sends the derived value 124, and any other relevant information (e.g., UID) to the secure service 104 for storage in the secure database 105.

Figure 8:
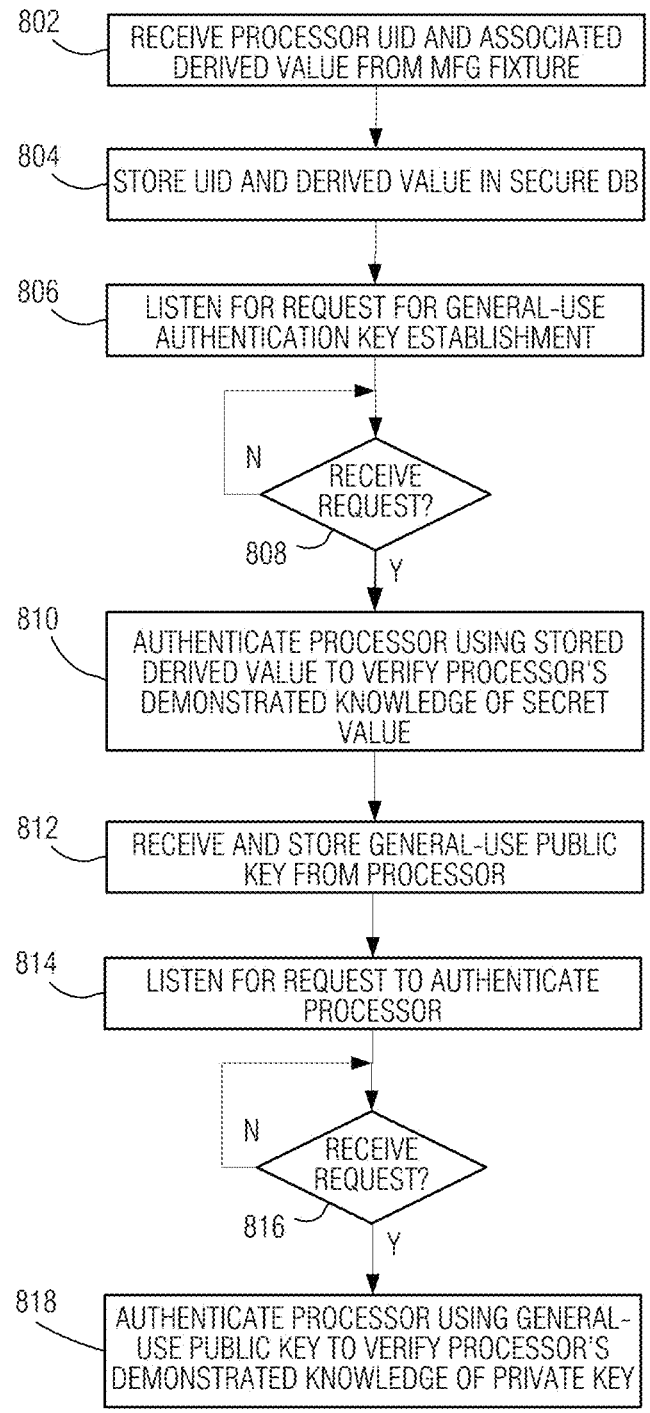
FIG. 8 is a flow diagram illustrating an example process of operation of a secure service according to some embodiments.

FIG. 8 is a flow diagram illustrating an example process of operation of secure service 104 according to some embodiments. At 802, secure service 104 receives the derived value 124 and any other relevant information from manufacturing fixture 150, such as the UID according to some embodiments. At 804, the received information is stored in secure database 105. Thereafter, as indicated at 806, insofar as the particular processor 120 is concerned, the process awaits a request from processor 120 to establish the general-purpose authentication key. When decision block 808 detects such a request, the process advances to 810, where the secure service performs an authentication protocol to authenticate processor 120. The process uses the derived value 124 stored in secure database 105 to verify the processor's demonstrated knowledge of the secret value 122 associated with the derived value 124. In response to successful authentication, at 812, secure service 104 receives and stores the general-purpose public key that was generated by the processor 120.

Henceforth, secure service 104 listens for a request to authenticate the processor 120 at 814. In response to receiving the request at 816, secure service 104 authenticates the processor 120 using the general-use public key to verify the processor's demonstrated knowledge of the associated private key at 818. In a related embodiment, after authentication of the processor 120, a digital certificate based on the general-use public key may be created, and disseminated, such that other entities besides the secure service 104 may authenticate the processor 120.

The following two illustrative examples describe operational steps in greater detail for (A) an embodiment in which the initial authentication basis utilizes a limited-use hash-based signature scheme; and (B) a related embodiment in which the initial authentication basis utilizes a commit-value scheme.

A. Hash-Based Signature Scheme.

In a stage of the processor manufacturing process where the processor is powered, such as in a manufacturing fixture, the processor generates a secret value that is not known outside the processor and stores that secret value securely. The processor may have PUF cells that are used for that purpose. Or the processor may have an internal random number generator that is used to generate a secret and then store in in a secure register (e.g., fuses) or some other internal non-volatile memory. The secret value may be cryptographically derived from the values in the PUF cells or register, possibly with additional input as well.

The processor then uses this secret value as a seed in an algorithm to generate a private-public key pair for a digital signature system. In this example, the notation, Pri-Key-Proc-Manu, Pub-Key-Proc-Manu denotes this private-public key pair generated by a processor in this manufacturing process. In general, it may be desirable to generate this private-public key as quickly as possible to reduce the time needed for the manufacturing operation on the manufacturing fixture. Accordingly, this example utilizes a one-time hash-based signature scheme. There may also be enough time in manufacturing to generate a hash-based signature scheme that may be used securely to sign n messages, where n is some predefined limit that is dictated by the type of hash-based signature scheme.

The public key for the signature scheme, Pub-Key-Proc-Manu, is output from the processor to the manufacturing fixture. The manufacturing fixture either already knows a Unique Processor ID for this processor, or the processor outputs a Unique Processor ID to the manufacturing fixture.

The manufacturing fixture signs the Pub-Key-Proc-Manu and the Unique Processor ID. The manufacturing fixture sends the Pub-Key-Proc-Manu and the Unique Processor ID and the signature to the secure service. These may be signed and sent individually, or in bulk.

The secure service verifies the signature of the manufacturing fixture, and if valid, records the Pub-Key-Proc-Manu and the Unique Processor ID and the signature in a secure database.

These operations establish the initial basis for authentication. At some point in the future, the processor receives an indication from the software executing on the end-product device that it needs to establish a general-use signature key with the secure service. In response, the processor computes a secret seed. Similar to the secret value computation at the initial authentication basis establishment stage described above, this secret seed may be restricted to only being stored internally in the processor in nonvolatile memory. One approach is to use a seed cryptographically derived from a PUF.

The processor computes a general-use private-public key pair for a signature scheme. This key pair is denoted as Pri-Key-Proc-Auth and Pub-Key-Proc-Auth. The processor uses the secret seed in a procedure that that generates a key pair for a digital signature scheme. One such scheme may be a hash-based signature scheme, such as XMSS, for example.

The processor signs the generated public key and the processor's UID with the one-time signature key, Pri-Key-Proc-Manu. In a related embodiment, this signature is generated using only values from NV memory in the processor, so that if the signature is lost, the exact same signature may be recreated by the processor.

The processor encrypts the public key, the signature, and the processor UID, with an encryption key known by the secure service. There are various known methods to establish such an encryption key. This operation may be used to provide privacy, so that the processor UID is not exposed to other software executing on the processor. If privacy is not needed, this encryption operation may be omitted, as the process is still secure without this encryption operation.

The processor outputs the encrypted data to software executing on the processor. The software on the processor sends the encrypted data to the secure service.

The secure service decrypts the message. and obtains the processor ID, looks up the Pub-Key-Proc-Manu in its database, and then checks the signature.

If the signature is valid, then the secure service stores the Pub-Key-Proc-Auth for that processor in its database. The Pub-Key-Proc-Auth may then be used to authenticate further messages from that processor.

In some embodiments, it is desired that the application of an OTS scheme within this setting be a fast key generation process since it is desired to minimize the time each processor needs to be powered during manufacturing.

Hash-based signatures represent efficient alternatives that withstand quantum attacks. Some efficient one-time signature schemes are variants of the Winternitz signature scheme.

The classical Winternitz one-time signature scheme produces signatures of size roughly nm/w bits, where signing requires around $2^w$n/w hash function evaluations. Here, m is the bit size of the message to be signed and n (typically m=n) the output size of the hash function and w governs the trade-off between the signature size and the signing time. To achieve b bits of security the parameters n and m are set to 2b.

Classical Winternitz OTS and Winternitz OTS (Barreto).
Key Generation Let $$t = t_1 + t_2, t_1 = \left\lceil \frac{n}{w} \right\rceil, t_2 = \left\lceil \frac{\lfloor \log_2 t_1 \rfloor + 1 + w}{w} \right\rceil.$$

The number of hash function evaluations amounts to $t \cdot (2^w - 1) + 1$, where w is typically 2 or 4.

Signing requires in average to evaluate the hash function $t \cdot 2^{w-1}$ times.

Verification requires in average to evaluate the hash function $t \cdot 2^{w-1}$ times.

Security $$b = \frac{n}{2} \text{(classical)},$$

b=$t_1 \cdot w - w - 1 - 2 \cdot \log_2(t_1 \cdot w)$ (Barreto)

The Winternitz scheme reduces all relevant sizes by a factor of two for the same security level leading to a twice as fast key generation engine compared to the classical scheme.

Winternitz OTS+.
Key Generation Let $$t = t_1 + t_2, t_1 = \left\lceil \frac{n}{\log_2 w} \right\rceil, t_2 = \left\lceil \frac{\log_2(t_1 \cdot (w-1))}{\log_2 w} \right\rceil.$$

The number of hash function evaluations amounts to $t \cdot (w-1)+1$, where w is typically 2 or 4.

Signing requires in average to evaluate the hash function $$t \cdot \frac{w}{2}$$

times.

Verification requires in average to evaluate the hash function $$t \cdot \frac{w}{2}$$

times.

Security b≥n−2·$\log_2$($w^2$ t−t)

In general, Barreto may be used in combination to the classical Winternitz scheme and WOTS+.

B. Commit-Value Scheme.

In a step of the processor manufacturing process where the processor is powered, such as in a manufacturing fixture, the processor generates a Secret (RK) that is not known outside the processor and stores that securely. The processor may have PUF cells that are used for that purpose, or the processor may have an internal random number generator that is used to generate a secret and then store in in a secure register (e.g., fuses) or some other internal non-volatile memory.

One approach is to let PUF_Value be a value determined by PUF cells in the processor, and Salt_1 a fixed value in the processor (not needed to be secret) then compute RK=H1 (Salt_1 , PUF_Value) where H1 is some cryptographic function such as a pseudo random function or a hash function.

The processor uses a Salt_2, a fixed value in the processor (not needed to be secret) and computes COMMIT=H2 (Salt_2, RK), where H2 is some cryptographic function such as a pseudo-random function or a one-way hash function.

The unit outputs COMMIT to be accessed by the manufacturing fixture. The manufacturing fixture either already knows a Unique Processor ID for this processor, or the Processor outputs a Unique Processor ID to the manufacturing fixture. The manufacturing fixture signs the COMMIT and the Unique Processor ID, and sends the COMMIT and the Unique Processor ID and the signature to the secure service. These may be signed and sent individually, or in bulk.

The secure service verifies the signature of the manufacturing fixture, and if valid, record COMMIT and the Unique Processor ID and the signature in a secure database.

These operations establish the initial basis for authentication. At some point in the future, the processor receives an indication from the software executing on the end-product device that it needs to establish a general-use signature key with the secure service.

In response, the processor computes a secret seed. This secret seed may be known only internally to the processor, and may be stored in nonvolatile memory. One approach is to use a seed cryptographically derived from a PUF.

The processor computes a general-use private public key pair for a signature scheme. This key pair is denoted by Pri-Key-Proc-Auth and Pub-Key-Proc-Auth. The processor uses the secret seed from step 8 in a procedure that that generates a key pair for a digital signature scheme. One such scheme may be a hash-based signature scheme, such as XMSS.

The processor computes H=H3(COMMIT,Pub-Key-Proc-Auth), where H3 is some suitable cryptographic function such as a pseudo-random function or a one-way hash function.

The processor encrypts the H generated above, and the processor ID, with an encryption key such that the encrypted message may be decrypted by the secure service. There are various known methods to establish such an encryption key. In one embodiment, a public key of a public/private key encryption method which was previously stored in the processor is used. This operation is used to provide privacy, so that the processor ID is not exposed to other software executing on the processor. If privacy is not needed, this encryption step may be omitted.

The processor outputs the encrypted data to software executing on the processor, and the software on the processor causes the processor to send the encrypted data to the secure service.

The secure service decrypts the message, and record H in the database as associated with Processor ID, signs H, Processor ID, and transmits the signature to the processor indicating that the secure service did indeed receive the message.

The processor verifies the signature using Pub-Key-PM-SCF and if valid, sends RK, Salt_2 and the Pub-Key-Proc-Auth and the Processor ID to the secure service. If privacy is desired, this message may be encrypted.

The secure service computes COMMIT=H2(Salt_2, RK) and check H=H3(COMMIT,Pub-Key-Proc-Auth). If satisfied it records the Pub-Key-Proc-Auth as associated to Processor ID. The Pub-Key-Proc-Auth may then be used to authenticate further messages from that processor.

In a related embodiment, The COMMIT value may be the result of iterating H2 n times, so that this may be used n times to validate n different keys to the secure service.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

ADDITIONAL NOTES & EXAMPLES

Example 1 is a computing device, comprising: execution hardware including at least one processor core, and non-volatile memory storing a secret value; wherein the computing device is configured to: create and store a public key and a private key in the non-volatile memory; send the public key to a remote computing entity and execute an initial authentication process with the remote computing entity wherein the computing device demonstrates knowledge of the secret value verifiable by a derived value, the secret value having been previously created and stored by the execution hardware during its manufacture and associated with the derived value that was shared with the remote entity; subsequently, perform a general-use authentication process including demonstrating knowledge of the private key by the computing device to the remote computing entity, wherein the second authentication process is traceable to the manufacture of the execution hardware of the computing device, the initial authentication process being a more limited-use authentication process than the general-use authentication process In Example 2, the subject matter of Example 1 optionally includes, wherein the secret value is known only by the execution hardware.

In Example 3, the subject matter of any one or more of Examples 1-2 optionally include, wherein the secret value is generated entirely by the execution hardware.

In Example 4, the subject matter of Example 1 optionally includes, wherein the secret value was provided to the execution hardware by an external entity.

In Example 5, the subject matter of any one or more of Examples 1-4 optionally include, wherein the derived value is a public key of a hash-based signature scheme.

In Example 6, the subject matter of any one or more of Examples 1-5 optionally include, wherein the derived value is a public key of a one-time-use signature scheme.

In Example 7, the subject matter of any one or more of Examples 1-6 optionally include, wherein the derived value is a public key of a n-use scheme, wherein n is less than 1025.

In Example 8, the subject matter of any one or more of Examples 1-7 optionally include, wherein the derived value is a commit value of a cryptographic commitment scheme.

In Example 9, the subject matter of any one or more of Examples 1-8 optionally include, wherein the derived value is produced by a first computing process carried out by the execution hardware that is less computationally intensive than a second computing process carried out by the execution hardware that produces the public key and private key.

In Example 10, the subject matter of any one or more of Examples 1-9 optionally include, wherein the public key and the private key are part of a non-limited-use public key cryptosystem.

In Example 11, the subject matter of any one or more of Examples 1-10 optionally include, wherein the public key and the private key are part of a hash-based multi-use public key cryptosystem.

Example 12 is a machine-implemented method for provisioning a general-use basis for authentication of a processor device, the method comprising: receiving a derived value produced by the processor device during its manufacture, the derived value being based on a secret value stored only by the processor device; subsequent to the manufacture of the processor device, in response to receipt of a public key to be associated with the processor device, performing an initial authentication process including verifying whether knowledge of a private key associated with that public key is possessed by same processor device that also has knowledge of the secret value used to produce the derived value; and subsequently, in response to a request to authenticate the processor device, performing a general-use authentication process using the public key to verify whether the processor device has knowledge of a private key associated with the public key, the authentication process producing an authentication traceable to the manufacture of the processor device; wherein the initial authentication process is a more limited-use authentication process than the general-use authentication process In Example 13, the subject matter of Example 12 optionally includes, wherein the secret value is known only by the processor device.

In Example 14, the subject matter of any one or more of Examples 12-13 optionally include, wherein the secret value is generated entirely by the processor device.

In Example 15, the subject matter of any one or more of Examples 12-14 optionally include, further comprising: generating and disseminating a digital certificate based on the public key.

In Example 16, the subject matter of any one or more of Examples 12-15 optionally include, further comprising: during the manufacture of the processor device, transferring the secret value to the processor device, including deleting all copies of the secret value other than the secret value stored in the processor device.

In Example 17, the subject matter of any one or more of Examples 12-16 optionally include, wherein the derived value is a public key of a hash-based signature scheme.

In Example 18, the subject matter of any one or more of Examples 12-17 optionally include, wherein the derived value is a public key of a one-time-use signature scheme.

In Example 19, the subject matter of any one or more of Examples 12-18 optionally include, wherein the derived value is a public key of an n-use scheme, wherein n is less than 1025.

In Example 20, the subject matter of any one or more of Examples 12-19 optionally include, wherein the derived value is a commit value of a cryptographic commitment scheme.

In Example 21, the subject matter of any one or more of Examples 12-20 optionally include, wherein the derived value is produced by a first computing process carried out by the processor device that is less computationally intensive than a second computing process carried out by the processor that produces the public key of the general-use basis for authentication.

In Example 22, the subject matter of any one or more of Examples 12-21 optionally include, wherein the general-use basis for authentication of the processor device is a non-limited-use public key cryptosystem.

In Example 23, the subject matter of any one or more of Examples 12-22 optionally include, wherein the general-use basis for authentication of the processor device is a hash-based multi-use public key cryptosystem.

Example 24 is a machine-readable medium containing instructions that, when executed by a computing device that includes execution hardware including at least one processor core, and non-volatile memory storing a secret value, causes the computing device to: create and store a public key and a private key in the non-volatile memory; send the public key to a remote computing entity and execute an initial authentication process with the remote computing entity wherein the computing device demonstrates knowledge of the secret value verifiable by a derived value, the secret value having been previously created and stored by the execution hardware during its manufacture and associated with the derived value that was shared with the remote entity; subsequently, perform a general-use authentication process including demonstrating knowledge of the private key by the computing device to the remote computing entity, wherein the second authentication process is traceable to the manufacture of the execution hardware of the computing device, the initial authentication process being a more limited-use authentication process than the general-use authentication process In Example 25, the subject matter of Example 24 optionally includes, wherein the secret value is known only by the execution hardware.

In Example 26, the subject matter of any one or more of Examples 24-25 optionally include, wherein the secret value is generated entirely by the execution hardware.

In Example 27, the subject matter of Example 24 optionally includes, wherein the secret value was provided to the execution hardware by an external entity.

In Example 28, the subject matter of any one or more of Examples 24-27 optionally include, wherein the derived value is a public key of a hash-based signature scheme.

In Example 29, the subject matter of any one or more of Examples 24-28 optionally include, wherein the derived value is a public key of a one-time-use signature scheme.

In Example 30, the subject matter of any one or more of Examples 24-29 optionally include, wherein the derived value is a public key of a n-use scheme, wherein n is less than 1025.

In Example 31, the subject matter of any one or more of Examples 24-30 optionally include, wherein the derived value is a commit value of a cryptographic commitment scheme.

In Example 32, the subject matter of any one or more of Examples 24-31 optionally include, wherein the derived value is produced by a first computing process carried out by the execution hardware that is less computationally intensive than a second computing process carried out by the execution hardware that produces the public key and private key.

In Example 33, the subject matter of any one or more of Examples 24-32 optionally include, wherein the public key and the private key are part of a non-limited-use public key cryptosystem.

In Example 34, the subject matter of any one or more of Examples 24-33 optionally include, wherein the public key and the private key are part of a hash-based multi-use public key cryptosystem.

Example 35 is a system for provisioning a general-use basis for authentication of a processor device, the system comprising: means for receiving a derived value produced by the processor device during its manufacture, the derived value being based on a secret value stored only by the processor device; means for performing an initial authentication process subsequent to the manufacture of the processor device, in response to receipt of a public key to be associated with the processor device, the initial authentication process including verifying whether knowledge of a private key associated with that public key is possessed by same processor device that also has knowledge of the secret value used to produce the derived value; and means for performing a general-use authentication process in response to a request to authenticate the processor device, the general-use authentication process using the public key to verify whether the processor device has knowledge of a private key associated with the public key, the authentication process producing an authentication traceable to the manufacture of the processor device; wherein the initial authentication process is a more limited-use authentication process than the general-use authentication process In Example 36, the subject matter of Example 35 optionally includes, wherein the secret value is known only by the processor device.

In Example 37, the subject matter of any one or more of Examples 35-36 optionally include, wherein the secret value is generated entirely by the processor device.

In Example 38, the subject matter of any one or more of Examples 35-37 optionally include, further comprising: means for generating and disseminating a digital certificate based on the public key.

In Example 39, the subject matter of any one or more of Examples 35-38 optionally include, further comprising: means for transferring the secret value to the processor device, during the manufacture of the processor device, including deleting all copies of the secret value other than the secret value stored in the processor device.

In Example 40, the subject matter of any one or more of Examples 35-39 optionally include, wherein the derived value is a public key of a hash-based signature scheme.

In Example 41, the subject matter of any one or more of Examples 35-40 optionally include, wherein the derived value is a public key of a one-time-use signature scheme.

In Example 42, the subject matter of any one or more of Examples 35-41 optionally include, wherein the derived value is a public key of an n-use scheme, wherein n is less than 1025.

In Example 43, the subject matter of any one or more of Examples 35-42 optionally include, wherein the derived value is a commit value of a cryptographic commitment scheme.

In Example 44, the subject matter of any one or more of Examples 35-43 optionally include, wherein the derived value is produced by a first computing process carried out by the processor device that is less computationally intensive than a second computing process carried out by the processor that produces the public key of the general-use basis for authentication.

In Example 45, the subject matter of any one or more of Examples 35-44 optionally include, wherein the general-use basis for authentication of the processor device is a non-limited-use public key cryptosystem.

In Example 46, the subject matter of any one or more of Examples 35-45 optionally include, wherein the general-use basis for authentication of the processor device is a hash-based multi-use public key cryptosystem.

Example 47 is a computer-readable medium containing instructions for execution by a computing system for provisioning a general-use basis for authentication of a processor device, the computer-readable medium comprising: instructions for receiving a derived value produced by the processor device during its manufacture, the derived value being based on a secret value stored only by the processor device; instructions for performing an initial authentication process subsequent to the manufacture of the processor device, in response to receipt of a public key to be associated with the processor device, the initial authentication process including verifying whether knowledge of a private key associated with that public key is possessed by same processor device that also has knowledge of the secret value used to produce the derived value; and instructions for performing a general-use authentication process in response to a request to authenticate the processor device, the general-use authentication process using the public key to verify whether the processor device has knowledge of a private key associated with the public key, the authentication process producing an authentication traceable to the manufacture of the processor device; wherein the initial authentication process is a more limited-use authentication process than the general-use authentication process In Example 48, the subject matter of Example 47 optionally includes, wherein the secret value is known only by the processor device.

In Example 49, the subject matter of any one or more of Examples 47-48 optionally include, wherein the secret value is generated entirely by the processor device.

In Example 50, the subject matter of any one or more of Examples 47-49 optionally include, further comprising: instructions for generating and disseminating a digital certificate based on the public key.

In Example 51, the subject matter of any one or more of Examples 47-50 optionally include, further comprising: instructions for transferring the secret value to the processor device, during the manufacture of the processor device, including deleting all copies of the secret value other than the secret value stored in the processor device.

In Example 52, the subject matter of any one or more of Examples 47-51 optionally include, wherein the derived value is a public key of a hash-based signature scheme.

In Example 53, the subject matter of any one or more of Examples 47-52 optionally include, wherein the derived value is a public key of a one-time-use signature scheme.

In Example 54, the subject matter of any one or more of Examples 47-53 optionally include, wherein the derived value is a public key of an n-use scheme, wherein n is less than 1025.

In Example 55, the subject matter of any one or more of Examples 47-54 optionally include, wherein the derived value is a commit value of a cryptographic commitment scheme.

In Example 56, the subject matter of any one or more of Examples 47-55 optionally include, wherein the derived value is produced by a first computing process carried out by the processor device that is less computationally intensive than a second computing process carried out by the processor that produces the public key of the general-use basis for authentication.

In Example 57, the subject matter of any one or more of Examples 47-56 optionally include, wherein the general-use basis for authentication of the processor device is a non-limited-use public key cryptosystem.

In Example 58, the subject matter of any one or more of Examples 47-57 optionally include, wherein the general-use basis for authentication of the processor device is a hash-based multi-use public key cryptosystem.

Example 59 is a system for provisioning a general-use basis for authentication of a processor device, the system comprising: server hardware, including a computing platform, a data store, and input/output facilities, the server hardware to: receive a derived value produced by the processor device during its manufacture, the derived value being based on a secret value stored only by the processor device; perform an initial authentication process subsequent to the manufacture of the processor device, in response to receipt of a public key to be associated with the processor device, the initial authentication process including verifying whether knowledge of a private key associated with that public key is possessed by same processor device that also has knowledge of the secret value used to produce the derived value; and perform a general-use authentication process in response to a request to authenticate the processor device, the general-use authentication process using the public key to verify whether the processor device has knowledge of a private key associated with the public key, the authentication process producing an authentication traceable to the manufacture of the processor device; wherein the initial authentication process is a more limited-use authentication process than the general-use authentication process In Example 60, the subject matter of Example 59 optionally includes, wherein the secret value is known only by the processor device.

In Example 61, the subject matter of any one or more of Examples 59-60 optionally include, wherein the secret value is generated entirely by the processor device.

In Example 62, the subject matter of any one or more of Examples 59-61 optionally include, wherein the server hardware is further to generate and disseminate a digital certificate based on the public key.

In Example 63, the subject matter of any one or more of Examples 59-62 optionally include, wherein the server hardware is further to transfer the secret value to the processor device, during the manufacture of the processor device, including deleting all copies of the secret value other than the secret value stored in the processor device.

In Example 64, the subject matter of any one or more of Examples 59-63 optionally include, wherein the derived value is a public key of a hash-based signature scheme.

In Example 65, the subject matter of any one or more of Examples 59-64 optionally include, wherein the derived value is a public key of a one-time-use signature scheme.

In Example 66, the subject matter of any one or more of Examples 59-65 optionally include, wherein the derived value is a public key of an n-use scheme, wherein n is less than 66 is missing parent: 1025.

In Example 67, the subject matter of any one or more of Examples 59-66 optionally include, wherein the derived value is a commit value of a cryptographic commitment scheme.

In Example 68, the subject matter of any one or more of Examples 59-67 optionally include, wherein the derived value is produced by a first computing process carried out by the processor device that is less computationally intensive than a second computing process carried out by the processor that produces the public key of the general-use basis for authentication.

In Example 69, the subject matter of any one or more of Examples 59-68 optionally include, wherein the general-use basis for authentication of the processor device is a non-limited-use public key cryptosystem.

In Example 70, the subject matter of any one or more of Examples 59-69 optionally include, wherein the general-use basis for authentication of the processor device is a hash-based multi-use public key cryptosystem.

Example 71 is a machine-readable medium containing instructions that, when executed by a computing device that includes execution hardware, causes the computing device to perform the operations according to any one of Examples 12-23.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computing device, comprising:
execution hardware including at least one processor core, and non-volatile memory storing a secret value;
wherein the computing device is configured to:
create and store a public key and a private key in the non-volatile memory;
send the public key to a remote computing entity and execute an initial authentication process with the remote computing entity wherein the computing device demonstrates knowledge of the secret value verifiable by a derived value, the secret value having been previously created and stored by the execution hardware during its manufacture and associated with the derived value that was shared with the remote entity; and
subsequently, perform a general-use authentication process including demonstrating knowledge of the private key by the computing device to the remote computing entity, wherein the second authentication process is traceable to the manufacture of the execution hardware of the computing device, the initial authentication process being a more limited-use authentication process than the general-use authentication process,
wherein the derived value is produced by a first computing process carried out by the execution hardware that is less computationally intensive than a second computing process carried out by the execution hardware that produces the public key and private key.

2. The computing device of claim 1, wherein the secret value is known only by the execution hardware.

3. The computing device of claim 1, wherein the secret value is generated entirely by the execution hardware.

4. The computing device of claim 1, wherein the secret value was provided to the execution hardware by an external entity.

5. The computing device of claim 1, wherein the derived value is a public key of a hash-based signature scheme.

6. The computing device of claim 1, wherein the derived value is a public key of a one-time-use signature scheme.

7. The computing device of claim 1, wherein the derived value is a public key of a n-use scheme, wherein n is less than 1025.

8. The computing device of claim 1, wherein the derived value is a commit value of a cryptographic commitment scheme.

9. The computing device of claim 1, wherein the public key and the private key are part of a non-limited-use public key cryptosystem.

10. The computing device of claim 1, wherein the public key and the private key are part of a hash-based multi-use public key cryptosystem.

11. A non-transitory machine-readable medium containing instructions that, when executed by a computing device that includes execution hardware including at least one processor core, and non-volatile memory storing a secret value, causes the computing device to:
create and store a public key and a private key in the non-volatile memory;
send the public key to a remote computing entity and execute an initial authentication process with the remote computing entity wherein the computing device demonstrates knowledge of the secret value verifiable by a derived value, the secret value having been previously created and stored by the execution hardware during its manufacture and associated with the derived value that was shared with the remote entity; and
subsequently, perform a general-use authentication process including demonstrating knowledge of the private key by the computing device to the remote computing entity, wherein the second authentication process is traceable to the manufacture of the execution hardware of the computing device, the initial authentication process being a more limited-use authentication process than the general-use authentication process,
wherein the derived value is produced by a first computing process carried out by the execution hardware that is less computationally intensive than a second computing process carried out by the execution hardware that produces the public key and private key.

* * * * *